(12) United States Patent
Watanabe

(10) Patent No.: US 8,204,670 B2
(45) Date of Patent: Jun. 19, 2012

(54) CRUISE CONTROL SYSTEM USING INSTRUCTION SENT FROM SWITCH

(75) Inventor: Shigeyoshi Watanabe, Oobu (JP)

(73) Assignee: Denso Corporation, Kariya (JP)

( * ) Notice: Subject to any disclaimer, the term of this patent is extended or adjusted under 35 U.S.C. 154(b) by 1357 days.

(21) Appl. No.: 11/882,291

(22) Filed: Jul. 31, 2007

(65) Prior Publication Data

US 2008/0023241 A1 Jan. 31, 2008

(30) Foreign Application Priority Data

Jul. 31, 2006 (JP) ................................. 2006-208452

(51) Int. Cl.
*G06F 7/00* (2006.01)
(52) U.S. Cl. ........................................... 701/93; 701/97
(58) Field of Classification Search .................... 701/70, 701/93, 102, 110, 29, 36, 97; 180/170, 190
See application file for complete search history.

(56) References Cited

U.S. PATENT DOCUMENTS

| | | | | |
|---|---|---|---|---|
| 4,394,739 A * | 7/1983 | Suzuki et al. | ............. | 701/97 |
| 4,453,088 A * | 6/1984 | Moore | ............. | 307/10.1 |
| 4,539,642 A * | 9/1985 | Mizuno et al. | ............. | 701/97 |
| 4,785,194 A * | 11/1988 | Gottlieb | ............. | 307/10.1 |
| 4,914,596 A | 4/1990 | Etoh et al. | | |
| 4,967,357 A * | 10/1990 | Mimura et al. | ............. | 701/97 |
| 5,031,715 A * | 7/1991 | Ogawa et al. | ............. | 180/179 |
| 5,050,698 A * | 9/1991 | Maeda et al. | ............. | 180/175 |
| 5,170,859 A | 12/1992 | Miyahara et al. | | |
| 5,216,609 A * | 6/1993 | Oo | ............. | 701/93 |
| 5,390,119 A * | 2/1995 | Oo et al. | ............. | 701/97 |
| 5,393,277 A * | 2/1995 | White et al. | ............. | 477/108 |
| 5,695,020 A * | 12/1997 | Nishimura | ............. | 180/169 |
| 5,790,017 A * | 8/1998 | Berryhill | ............. | 340/475 |
| 6,019,702 A * | 2/2000 | Ehrenhardt et al. | ............. | 477/97 |
| 6,064,938 A * | 5/2000 | Kamishima et al. | ............. | 701/97 |
| 2005/0257976 A1* | 11/2005 | Moczydlowski | ............. | 180/170 |
| 2006/0082386 A1* | 4/2006 | Katrak et al. | ............. | 326/59 |

FOREIGN PATENT DOCUMENTS

JP 58-051313 3/1983

(Continued)

OTHER PUBLICATIONS

Japanese Office Action dated Jun. 1, 2010, issued in corresponding Japanese Application No. 2006-208452, with English translation.

(Continued)

*Primary Examiner* — John Nguyen
*Assistant Examiner* — Michael Ng
(74) *Attorney, Agent, or Firm* — Nixon & Vanderhye P.C.

(57) ABSTRACT

In a cruise control system installed in a vehicle and electrically connected to a plurality of switches installed therein, a detecting unit detects that one of the plurality of switches is operated. A cruise control unit executes cruise control of the vehicle based on an instruction corresponding to the one of the plurality of switches upon detection of the one of the plurality of switches being operated. When the detecting unit detects that, during the first switch being operated, the second switch is operated, and when a combination of first and second instructions sent from the detected first and second switches is matched with at least one predetermined combination of instructions to be sent from the plurality of switches, a cruise control disabling unit disables the cruise control unit to execute cruise control of the vehicle based on the second instruction.

24 Claims, 7 Drawing Sheets

FOREIGN PATENT DOCUMENTS

| | | |
|---|---|---|
| JP | 02-290740 | 11/1990 |
| JP | 04-133823 | 5/1992 |
| JP | 2003-137401 | 5/2003 |
| JP | 2004-042746 | 2/2004 |
| JP | 2005-251504 | 9/2005 |

OTHER PUBLICATIONS

Communication in EP 07015031.3 dated Nov. 27, 2007 with Extended European Search Report dated Nov. 8, 2007 and the abstract as modified.

Examination Report in EP 07015031.3.

* cited by examiner

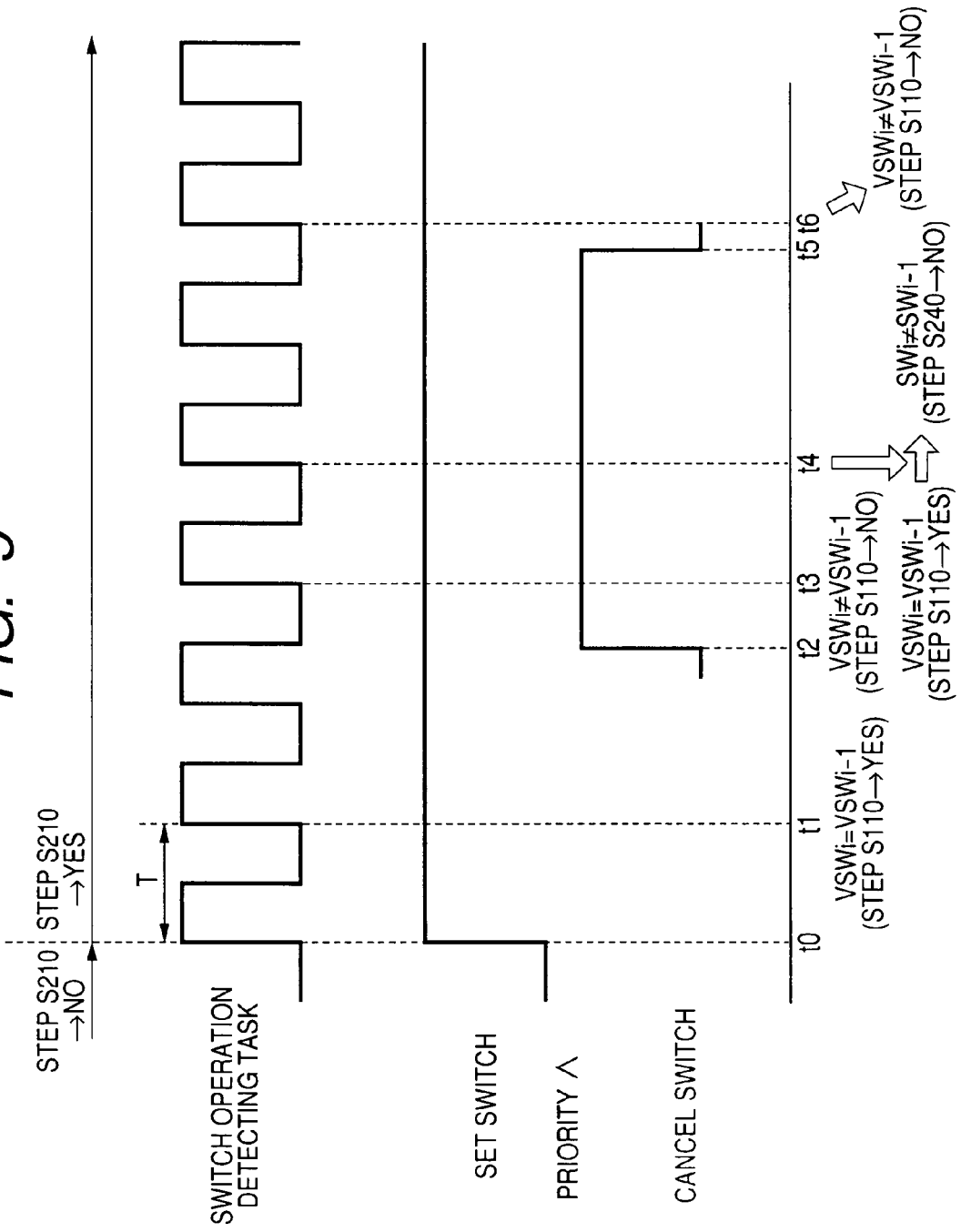

CRUISE CONTROL SYSTEM USING INSTRUCTION SENT FROM SWITCH

CROSS REFERENCE TO RELATED APPLICATIONS

This application is based on Japanese Patent Application 2006-208452 filed on Jul. 31, 2006. This application claims the benefit of priority from the Japanese Patent Application, so that the descriptions of which are all incorporated herein by reference.

FIELD OF THE INVENTION

The present invention relates to a cruise control system for carrying out cruise control based on instructions sent from a plurality of switches.

BACKGROUND OF THE INVENTION

Cruise control systems are designed to automatically control the speed of a vehicle. Specifically, with a cruise control system, the driver selects a desired interval to follow traffic as well as the desired cruise speed. When slower traffic is encountered, the cruise control system works to alter a vehicle speed to maintain the desired interval while following traffic. The vehicle speed is controlled by the cruise control system with moderate braking when needed.

When traffic clears, the cruise control system works to resume the desired cruise speed. The driver can override the system by braking at any time.

Such a cruise control system is normally designed to change its operation according to instructions sent from a plurality of driver operable switches.

For example, the plurality of driver operable switches are designed as push-button switches, and include a main switch, a cancel switch, a set switch, and a resume switch.

When pressed once under no cruise control being executed, the main switch sends, to the cruise control system, an instruction enabling the cruise control system to shift its operation mode to cruise-control ready mode in which the cruise control system waits for starting the cruise control.

When pressed once under cruise control being executed, the main switch sends, to the cruise control system, an instruction enabling the cruise control system to cancel or stop the cruise control.

When pressed, the cancel switch sends, to the cruise control system, an instruction enabling the cruise control system to cancel or stop the cruise control.

When pressed, the set switch sends, to the cruise control system, an instruction enabling the cruise control system to execute constant vehicle-speed control to thereby constantly set the vehicle speed at the current speed at the time of the set switch being pressed.

When pressed, the resume switch sends, to the cruise control system, an instruction enabling the cruise control system to resume the vehicle speed at a preset desired speed.

In addition, while the constant vehicle speed control is executed by the cruise control system by the pressing of the set switch, pressing the set switch one or more times sends, to the cruise control system, instructions enabling the cruise control system to, for example, accelerate the vehicle speed at one or more steps corresponding to the one or more times.

While the constant vehicle speed control is executed by the cruise control system by the pressing of the set switch, pressing the resume switch one or more times sends, to the cruise control system, instructions enabling the cruise control system to, for example, decelerate the vehicle speed at one or more steps corresponding to the one or more times.

In the configuration of the cruise control system, when the driver unintentionally presses either the set switch or resume switch while the cancel switch is being pressed or the main switch for canceling is being pressed, the set switch or resume switch being pressed enables the cruise control system to continue the corresponding cruise control despite of the driver's intention of canceling cruise control. This may cause the driver to mistrust in the cruise control system.

Thus, in order to address the problem set forth above, U.S. Pat. No. 5,170,859 corresponding to Japanese Patent Publication No. 2926064 discloses a constant-speed cruising system.

When at least two switches in the main switch, cancel switch, set switch and resume switch, are substantially simultaneously pressed, the constant-speed cruising system disclosed in the U.S. patent Publication is configured to disable the pressing of the at least two switches.

For example, it is assumed that, while the constant vehicle speed control is executed by the cruise control system by the pressing of the set switch, the driver tries to press the set switch for accelerating the vehicle speed, but simultaneously presses both the set switch and the resume switch in error.

In this assumption, the constant-speed cruising system disclosed in the U.S. patent Publication disables any of the set and resume switches being pressed.

In this assumption, focusing on the instant at which the set and resume switches are simultaneously pressed, when the resume switch is pressed, and thereafter the set switch is pressed, the constant-speed cruising system recognizes the pressing of the set switch as the latest driver's switch operation. That is, even though the constant-speed cruising system recognizes the latest driver's switch operation as intended by the driver, the constant-speed cruising control system disables the latest driver's switch operation, which may bring discomfort to the driver.

SUMMARY OF THE INVENTION

In view of the background, an object of at least one aspect of the present invention is to provide cruise control systems for executing cruise control depending on instructions sent from a plurality of switches; this system is capable of properly identifying whether to disable instructions sent from some of the plurality of switches even if at least one of some of them is unintentionally operated.

According to one aspect of the present invention, there is provided a cruise control system installed in a vehicle and electrically connected to a plurality of switches installed therein. The plurality of switches include a first and a second switch. Each of the plurality of switches works to send, to the cruise control system, an instruction associated with cruise control of the vehicle when operated. The cruise control system includes a detecting unit configured to detect that at least one of the plurality of switches is operated. The cruise control system includes a determining unit configured to, when the detecting unit detects that, during the first switch being operated, the second switch is operated, determine whether a combination of first and second instructions sent from the detected first and second switches is matched with at least one predetermined combination of instructions to be sent from the plurality of switches. The cruise control system includes a cruise control unit configured to accept an instruction corresponding to the at least one of the plurality of switches upon detection of the at least one of the plurality of switches being operated to thereby execute cruise control of the vehicle based on the accepted instruction. The cruise control unit is configured to prevent acceptance of the second instruction when it is determined that the combination of the first and second instructions is matched with the at least one predetermined combination of instructions to be sent from the plurality of switches.

According to another aspect of the present invention, there is provided a cruise control system installed in a vehicle and electrically connected to a plurality of switches installed therein. The plurality of switches include a first and a second switch. Each of the plurality of switches works to send, to the cruise control system, an instruction associated with cruise control of the vehicle when operated. The cruise control system includes a detecting unit configured to detect that at least one of the plurality of switches is operated, and a cruise control unit configured to execute cruise control of the vehicle based on an instruction corresponding to the at least one of the plurality of switches upon detection of the at least one of the plurality of switches being operated. The cruise control system includes a cruise control disabling unit configured to, when the detecting unit detects that, during the first switch being operated, the second switch is operated, and when a combination of first and second instructions sent from the detected first and second switches is matched with at least one predetermined combination of instructions to be sent from the plurality of switches, disable the cruise control unit to execute cruise control of the vehicle based on the second instruction.

According to a further aspect of the present invention, there is provided a program product embedded in a media accessible by a computer installed in a vehicle and electrically connected to a plurality of switches installed therein. The plurality of switches include a first and a second switch. Each of the plurality of switches works to send, to the computer, an instruction associated with cruise control of the vehicle when operated. The program product includes first means for instructing the computer to detect that at least one of the plurality of switches is operated. The program product includes second means for instructing the computer to, when, during the first switch being operated, operation of the second switch is detected, determine whether a combination of first and second instructions sent from the detected first and second switches is matched with at least one predetermined combination of instructions to be sent from the plurality of switches. The program product includes third means for instructing the computer to accept an instruction corresponding to the at least one of the plurality of switches upon detection of the at least one of the plurality of switches being operated to thereby execute cruise control of the vehicle based on the accepted instruction. The program product includes fourth means for instructing the computer to prevent acceptance of the second instruction when it is determined that the combination of the first and second instructions is matched with the at least one predetermined combination of instructions to be sent from the plurality of switches.

According to a still further aspect of the present invention, there is provided a program product embedded in a media accessible by a computer installed in a vehicle and electrically connected to a plurality of switches installed therein. The plurality of switches include a first and a second switch. Each of the plurality of switches works to send, to the computer, an instruction associated with cruise control of the vehicle when operated. The program product includes first means for instructing the computer to detect that at least one of the plurality of switches is operated, and second means for instructing the computer to execute cruise control of the vehicle based on an instruction corresponding to the at least one of the plurality of switches upon detection of the at least one of the plurality of switches being operated. The program product includes third means for instructing the computer to, when, during the first switch being operated, the second switch is operated, and when a combination of first and second instructions sent from the detected first and second switches is matched with at least one predetermined combination of instructions to be sent from the plurality of switches, disable the computer to execute cruise control of the vehicle based on the second instruction.

BRIEF DESCRIPTION OF THE DRAWINGS

Other objects and aspects of the invention will become apparent from the following description of embodiments with reference to the accompanying drawings in which:

FIG. 5 is a timing chart schematically illustrating an example of on-off timings of set and cancel switches according to the embodiment;

DETAILED DESCRIPTION OF EMBODIMENTS OF THE INVENTION

Figure 1:
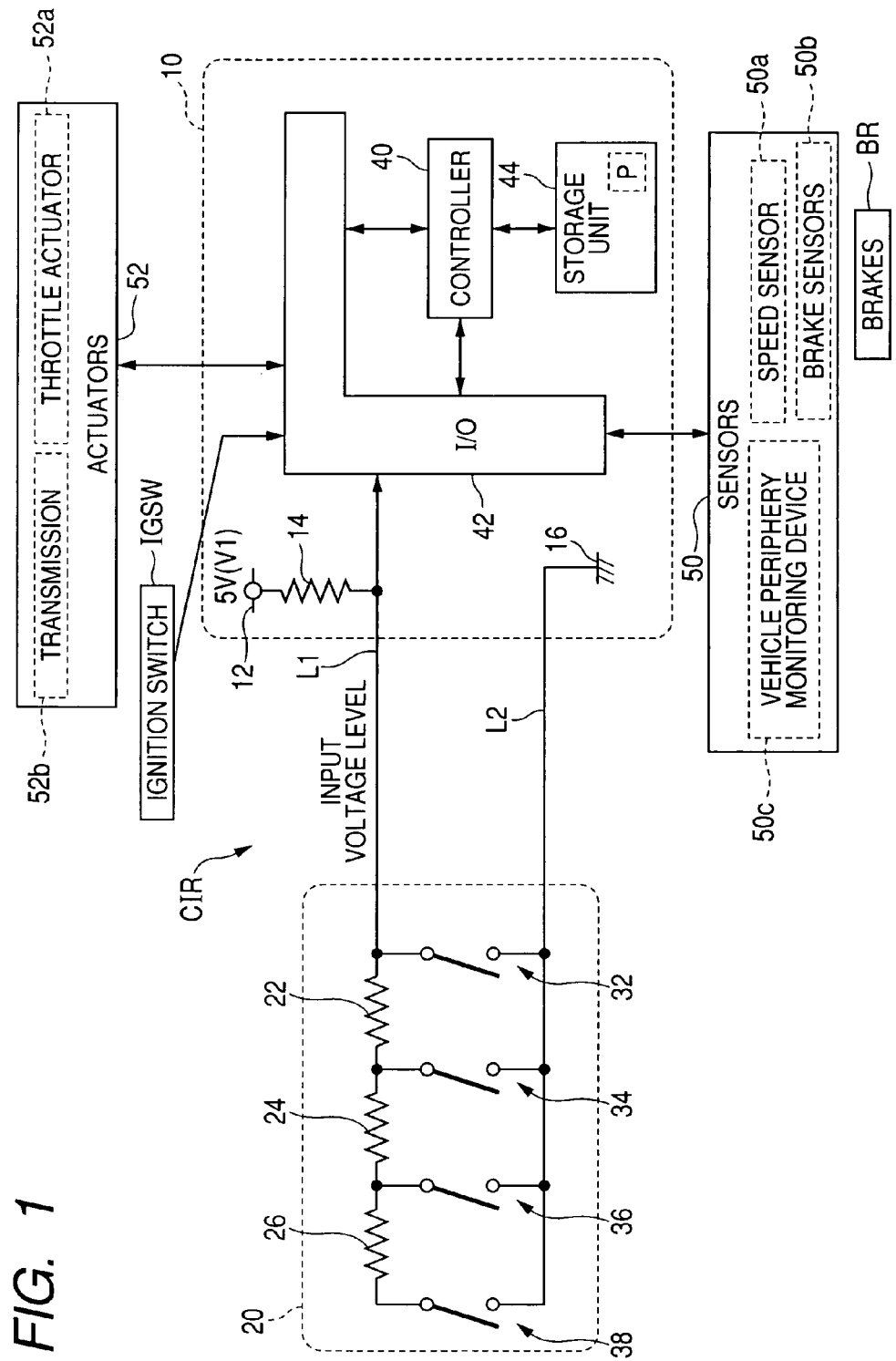
FIG. 1 is a block diagram schematically illustrating an example of the overall structure of a cruise control system according to an embodiment of the present invention.

An embodiment of the present invention will be described hereinafter with reference to the accompanying drawings. In the drawings, identical reference characters are utilized to identify identical corresponding components.

Referring to FIG. 1, an example of the structure of a cruise control system 1, which has been installed in a vehicle, is illustrated.

Specifically, the cruise control system 1 includes a control unit 10, a pair of first and second input lines L1 and L2, and a driver's operable console 20.

The control unit 10 is designed to execute cruise control of the vehicle, such as to automatically control the vehicle speed.

The first and second input lines L1 and L2 electrically connects between the control unit 10 and the driver's operable console 20.

The driver's operable control 20 is configured to send, to the control unit 10, driver's instructions associated with the speed control of the vehicle via the first and second input lines L1 and L2.

The control unit 10 is equipped with an internal power supply 12, a pull-up resistor 14, a ground 16, a controller 40, an input/output (I/O) interface 42, and a storage unit 44; these components 42 and 44 are electrically connected to the controller 40.

The consol 20 is equipped with first to third resistors 22, 24, and 26, a main switch 32, a cancel switch 34, a set switch 36, and a resume switch 38.

To the power supply 12, a voltage V1 is fed from a power supply source installed in the vehicle; this input voltage V1 has, for example, 5 V.

The pull-up resistor 14 is electrically connected to the power supply 12 and the first input line L1. The pull-up resistor 14 allows the first input line L1 to be pulled up. One end of the first input line L1 is electrically connected to the I/O interface 42 of the control unit 10. The second input line L2 is electrically connected to the ground 16 serving as, for example, the signal common of the cruise control system 1.

The first and second input lines L1 and L2 are substantially arranged to be parallel to each other.

The other end of the first input line L1 is electrically connected to one end of the first resistor 22, and the other end of the first resistor 22 is electrically connected to one end of the second resistor 24. The other end of the second resistor 24 is electrically connected to one end of the third resistor 26.

Each of the switches 32, 34, 36, and 38 is designed as, for example, a momentary push-button switch.

Specifically, the main switch 32 is electrically connected between the input line L1 and the second input line (ground line) L2.

The cancel switch 34 is electrically connected between the other end of the first resistor 22 and the second input line L2.

The set switch 36 is electrically connected between the other end of the second resistor 24 and the second input line L2.

The resume switch 38 is electrically connected between the other end of the third resistor 26 and the second input line L2.

The electrical connections among the switches 32, 34, 36, and 38 allow the turning on of any one of the switches 32, 34, 36, and 38 to set a unique resistance of an input level changing circuit CIR constituted between the power supply 12 and the ground 16.

Specifically, assuming that the resistors 14, 22, 24, and 26 have resistances R14, R22, R24, and R26, respectively, when the switches 32, 34, 36, and 38 are off, the input level on the first input line L1 is set to the voltage level V1.

The turning on of the main switch 32 allows the resistance of the input level changing circuit CIR to be set to the resistance R14 of the pull-up resistor 14.

Specifically, the input level on the first input line L1 is set to be substantially zero. The voltage level in this case will be referred to as "voltage level V5".

The turning on of the of the cancel switch 34 allows the resistance of the input level changing circuit CIR to be set to the combined resistance of R14 and R22.

Specifically, the input level on the first input line L1 is set to "V1×R14/(R14+R22)"; this voltage level will be referred to as "voltage level V4".

The turning on of the set switch 34 allows the resistance of the input level changing circuit CIR to be set to the combined resistance of R14, R22, and R24.

Specifically, the input level on the first input line L1 is set to "V1×R14/(R14+R22+R24)"; this voltage level will be referred to as "voltage level V3".

The turning on of the of the resume switch 38 allows the resistance of the input level changing circuit CIR to be set to the combined resistance of R14, R22, R24, and R26.

Specifically, the input level on the first input line L1 is set to "V1×R14/(R14+R22+R24+R26)"; this voltage level will be referred to as "voltage level V2".

As described above, because the voltage levels V1 to V5 are different from each other, the input level changing circuit CIR of the console 20 works to change an input level to the controller 40 via the I/O interface 42 depending on any one of the switches 32, 34, 36, and 38 being turned on.

Accordingly, the controller 40 works to identify which switches are operated by the driver based on any one of the input levels thereto via the first and second input lines L1 and L2.

Figure 2:
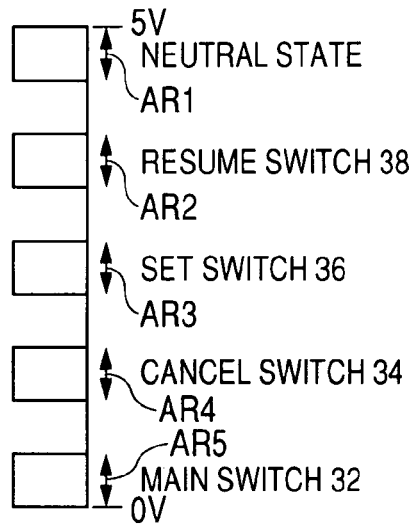
FIG. 2 is a view schematically illustrating an example of an allowable range of each voltage level corresponding to each switch illustrated in FIG. 1.

As illustrated in FIG. 2, because the voltage levels V1 to V5 are greater step-by-step in the order from V5 to V1, the controller 40 identifies that:

the main switch 32 is only turned on when the input level thereto via the first and second input lines L1 and L2 is lied within an allowable range AR5 defined at around the voltage level V5;

the cancel switch 34 is only turned on when the input level thereto via the first and second input lines L1 and L2 is lied within an allowable range AR4 defined at around the voltage level V4;

the set switch 36 is only turned on when the input level thereto via the first and second input lines L1 and L2 is lied within an allowable range AR3 defined at around the voltage level V3;

the resume switch 38 is only turned on when the input level thereto via the first and second input lines L1 and L2 is lied within an allowable range AR2 defined as around the voltage level V2; and the switches 32, 34, 36, and 38 are off when the input level thereto via the first and second input lines L1 and L2 is lied within an allowable range AR1 defined as around the voltage level V1.

Note that the state in which the switches 32, 34, 36, and 38 are in off is represented as "neutral state".

In the structure of the input level changing circuit CIR illustrated in FIG. 1, even if at least two switches in the switches 32, 34, 36, and 38 are substantially simultaneously turned on, a resistance of the input level changing circuit CIR is set to be identical to a resistance of the input level changing circuit CIR in which one of the at least two switches is only turned on; this one of the at least two switches is located closer to the pull-up resistor 14 than the other thereof.

Accordingly, priorities are assigned to the main switch 32, the cancel switch 34, the set switch 36, and the resume switch 38 in this order.

For example, even if switches 34 and 36 are substantially simultaneously turned on, a resistance of the input level changing circuit CIR is set to be identical to a resistance of the input level changing circuit CIR in which the switch 34 is only turned on because the switch is higher in priority than the switch 36.

Referring to FIG. 1, the cruise control system 1 includes sensors 50 and actuators 52, these components 50 and 52 are electrically connected to the I/O interface 42.

The sensors 50 includes a vehicle-speed sensor 50a, brake sensors 50b, a vehicle periphery monitoring device 50c, and other sensors associated with the cruise control of the vehicle.

The vehicle-speed sensor 50a is so arranged in the vehicle to measure the speed of the vehicle, and is operative to send, to the controller 40 via the I/O interface 42, a measurement signal indicative of the speed of the vehicle.

Each of the brake sensors 50b is so arranged in the vehicle as to detect the operating condition of a corresponding one of brakes BR for respective wheels of the vehicle, and is operative to send, to the controller 40 via the I/O interface 42, a measurement signal indicative of the operating condition of the corresponding one of the brakes.

The vehicle periphery monitoring device 50c is operative to monitor traffic on, for example, both the front and rear sides of the vehicle using, for example, detection waves and/or cameras, and to send, to the controller 40 via the I/O interface 42, the monitored traffic on both the front and rear sides of the vehicle. The monitored traffic for example includes a distance between a forward vehicle and the vehicle, a traveling direction of the forward vehicle, a distance between a rear vehicle and the vehicle, and a traveling direction of the rear vehicle.

The actuators 52 include a throttle actuator 52a and an automatic transmission 52b. The throttle actuator 52a mechanically linked to a throttle valve disposed in an intake pipe of the engine to be rotatable thereby.

Specifically, the throttle actuator 52a works to rotate the throttle valve so as to control the amount of air-fuel mixture that reaches cylinders of the engine, thus controlling the speed of the vehicle.

The automatic transmission 52b has a gear train. The automatic transmission 52b is configured to take the power from the engine and control the transfer of the power to a drive shaft of the vehicle or the wheels while changing the gear ratio of the gear train. The change of the gear ratio allows the speed of the vehicle to be controlled.

The controller 40 consists of, for example, at least one computer.

The I/O interface 42 is operative to execute, as need arises, conversion processes on signals/pieces of data to be input to or sent from the controller 40 to thereby allow the controller 40 and external devices to be communicated therebetween.

In the storage unit 44, a plurality of programs P are installed in advance or downloaded from a host system via radio waves.

Figure 3:
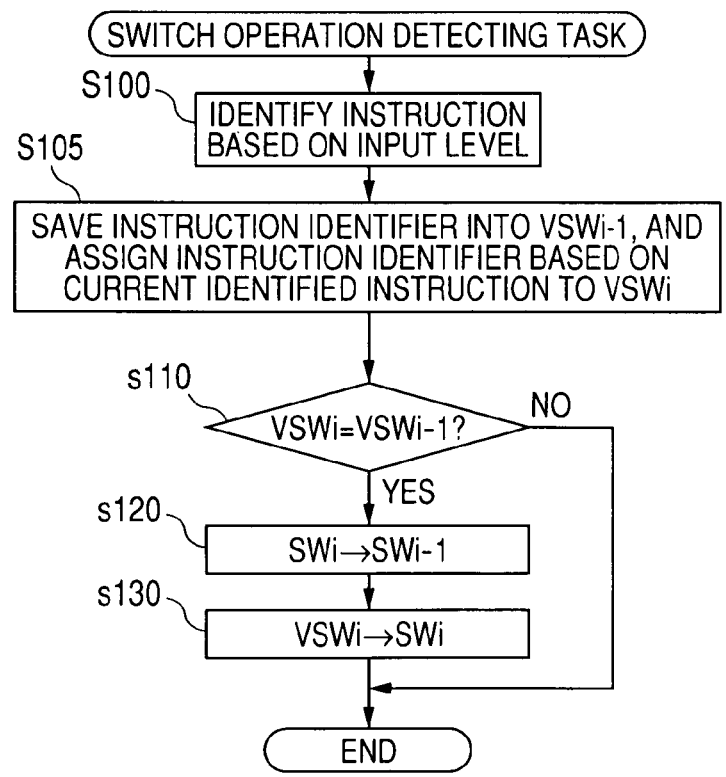
FIG. 3 is a flowchart schematically illustrating an example of a switch-operation detecting task to be executable by a controller according to the embodiment.

In accordance with a switch-operation detecting program included in the programs P stored in the storage unit 44, the controller 40 is designed to execute, based on the input level via the first and second input lines L1 and L2, a switch-operation detecting task illustrated as an example in FIG. 3

Figure 4:
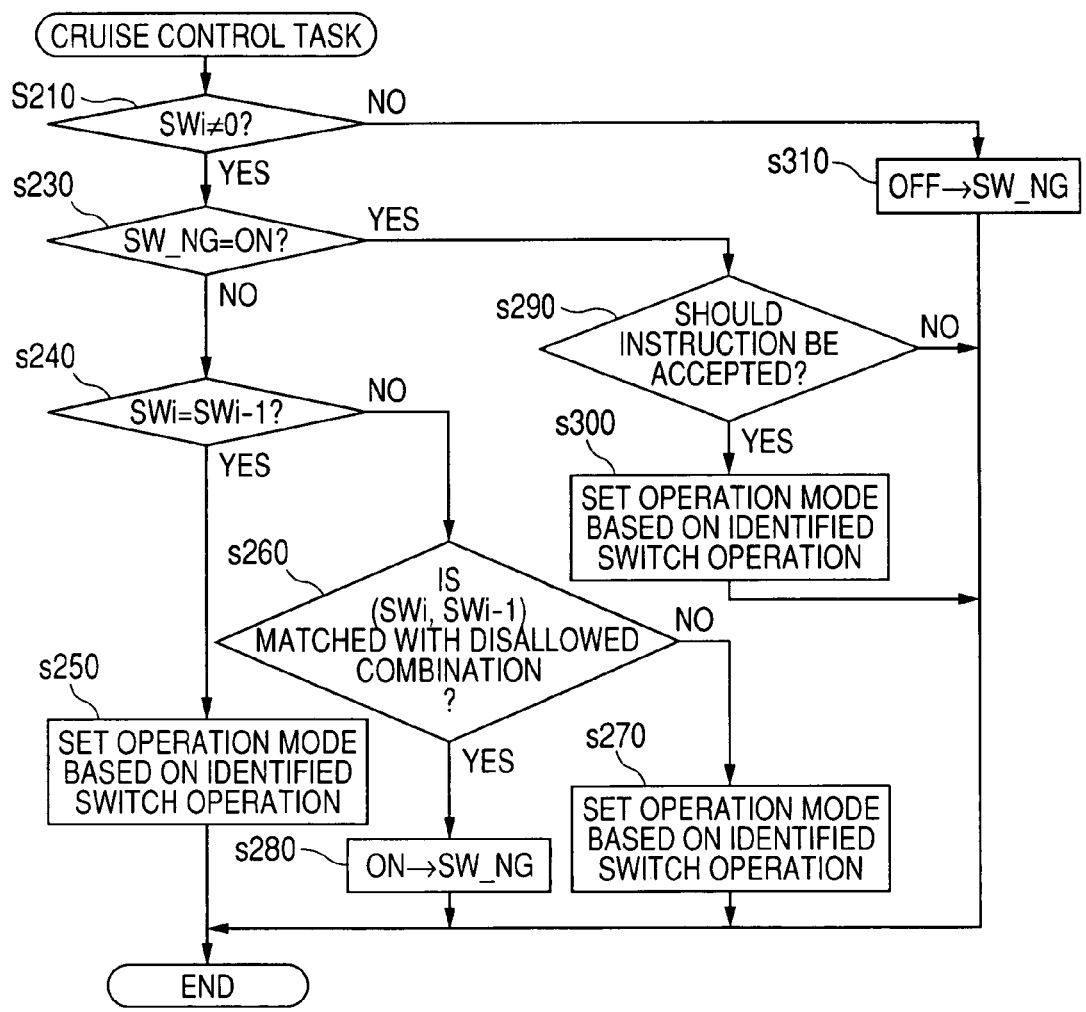
FIG. 4 is a flowchart schematically illustrating an example of a cruise control task to be executable by the controller according to the embodiment.

In accordance with a cruise control program included in the programs P stored in the storage unit 44, the controller 40 is designed to execute a cruise control task based on the result of the switch operation detecting task, and the measurement signals sent from the sensors and the operating conditions of the brakes; this cruise control task is illustrated as an example in FIG. 4.

In the embodiment, when operated, such as pressed, once by the driver, the main switch 32 is configured to send, as the voltage level V5, an instruction that enables the controller 18 to shift its operation mode to cruise-control ready mode in which it waits for starting the cruise control.

The main switch 32 is designed to, when operated once under no cruise control being executed, send, as the voltage level V5 to the control unit 20, an instruction enabling the controller 40 to shift its operation mode to cruise-control ready mode in which the controller 40 waits for starting the cruise control.

The main switch 32 is also designed to, when operated once under cruise control being executed, send, as the voltage level V5 to the control unit 10, an instruction enabling the controller 40 to cancel the cruise control.

When operated, the cancel switch 34 is designed to send, as the voltage level V4 to the control unit 10, an instruction enabling the controller 40 to cancel the cruise control.

When operated, the set switch 36 is designed to send, as the voltage level V3 to the control unit 10, an instruction enabling the controller 40 to execute constant vehicle-speed control to thereby constantly set the vehicle speed at the current speed at the time of the set switch 36 being pressed.

When operated, the resume switch 38 is designed to send, as the voltage level V2 to the control unit 10, an instruction enabling the controller 40 to resume the constant vehicle-speed control to thereby set the vehicle speed at the previously set constant speed.

While no switches 32, 34, 36, and 38 are operated, the voltage level V1 to be input to the control unit 10 represents the neutral state in which the driver intends not to carry out the cruise control.

In addition, while the constant vehicle speed control is executed by the controller 40 by the pressing of the set switch 36, operating the set switch 36 one or more times sends, to the control unit 10, instructions enabling the controller 40 to, for example, accelerate the vehicle speed at one or more steps corresponding to the one or more times.

While the constant vehicle speed control is executed by the controller 40 by the pressing of the set switch 36, operating the resume switch 38 one or more times sends, to the control unit 10, instructions enabling the controller 40 to, for example, decelerate the vehicle speed at one or more, steps corresponding to the one or more times.

Next, the switch operation detecting task to be executable by the controller 40 will be described hereinafter with reference to FIG. 3. For example, the switch-operation detecting program stored in the storage unit 44 causes the controller 40 to repeatedly execute the switch operation detecting task at predetermined time intervals after the control unit 10 is activated in response to the driver's shift of an ignition switch IGSW of the vehicle from the off position to the ignition position.

When launching the switch-operation detecting program, in step S100, the controller 40 identifies an instruction based on the input level from the console 20 via the first and second input lines L1 and L2.

Specifically, in step S105, every execution of the switch operation detecting task, the controller 40 saves a unique instruction identifier, which has been set to a current variable VSWi and represents the previously identified instruction, to be assigned to a previous variable VSWi-1, and assigns an instruction identifier representing the currently identified instruction to the current variable VSWi.

Note that, in the embodiment, when the currently identified instruction corresponds to the voltage level V1 indicative of the neutral state (all switches are in off state), the controller 40 assigns, as an instruction identifier, a value "0" to the current variable VSWi.

When the currently identified instruction corresponds to the voltage level V5 representing that the main switch 32 is turned on, the controller 40 assigns, as an instruction identifier, a value "1" to the current variable VSWi.

When the currently identified instruction corresponds to the voltage level V4 representing that the cancel switch 34 is turned on, the controller 40 assigns, as an instruction identifier, a value "2" to the current variable VSWi.

When the currently identified instruction corresponds to the voltage level V3 representing that the set switch 36 is turned on, the controller 40 assigns, as an instruction identifier, a value "3" to the current variable VSWi.

When the currently identified instruction corresponds to the voltage level V2 representing that the resume switch 38 is turned on, the controller 40 assigns, as an instruction identifier, a value "4" to the current variable VSWi.

Subsequently, in step S110, the controller 40 checks whether the current variable VSWi is matched with the previous variable VSWi-1.

For example, the input level from the console 20 via the first and second input lines L1 and L2 is kept unchanged, the operation in step S105 allows the instruction identifier assigned to the previous variable VSWi-1 to be identical to that assigned to the current variable VSWi.

Specifically, when it is checked that the current variable VSWi is matched with the previous variable VSWi-1 (the determination in step S110 is YES), the controller 40 saves an instruction identifier, which has been assigned to a current switch variable SWi, into a previous switch variable SWi-1 in step S120. Subsequently, the controller 40 assigns the instruction identifier, which has been assigned to the current variable VSWi, to the current switch variable SWi.

As another example, the input level from the console 20 via the first and second input lines L1 and L2 is changed from a previous voltage level to a current voltage level, the operation in step S105 allows the instruction identifier assigned to the previous variable VSWi-1 to be mismatched with that set to the current variable VSWi.

Specifically, when it is checked that the current variable VSWi is mismatched with the previous variable VSWi-1 (the determination in step S110 is NO), the controller 40 exits the switch operation detecting task without executing the operations in steps S120 and S130.

As described above, in the embodiment, when the same instruction identifier is set to both the current variable VSWi and the previous variable VSWi-1, the controller 40 is programmed to assign the instruction identifier, which has been assigned to the current variable VSWi, to the current switch variable SWi.

This means that the controller 40 detects an instruction corresponding one of the switches 32, 34, 36, and 38 when it is determined that the instruction identifier corresponding to one of the switches 32, 34, 36, and 38 is kept unchanged during repeated execution of the switch operation detecting task. This program structure makes it possible to prevent the controller 40 from misjudging that any switching operations occur due to disturbance, such as noise.

Next, the cruise control task to be executable by the controller 40 will be described hereinafter with reference to FIG. 4. For example, the cruise control program stored in the storage unit 44 causes the controller 40 to repeatedly execute the cruise control task at predetermined time intervals after the control unit 10 is activated in response to the driver's shift of the ignition switch IGSW of the vehicle from the off position to the ignition position.

When launching the cruise control program, in step S210, the controller 40 checks whether an instruction identifier assigned to the current switch variable SWi is unequal to "0".

Specifically, to the current switch variable SWi, the instruction identifier showing the current state of driver's operation of the switches 32, 34, 36, 38 has been assigned by the switch operation detecting task.

For example, when an instruction identifier of "0" is assigned to the current switch variable SWi, the corresponding instruction identifier shows the neutral state in which the switches 32, 34, 36, and 38 are off.

That is, the operation in step S210 allows the controller 40 to determine whether any one of the switches 32, 34, 36, and 38 is turned on.

When it is determined that an instruction identifier assigned to the current switch variable SWi is unequal to "0" (the determination in step S210 is YES), the controller 40 checks whether information indicative of OFF is set to an NG flag SW_NG in step S230. Note that the NG flag SW_NG is for example set by software in the controller 40 each time the control unit 10 is booted. The information indicative of OFF is set as default information of the NG flag SW_NG during the start-up process of the control unit 10.

As described hereinafter, information indicative of ON is set to the NG flag SW_NG when the start of cruise control is determined to be prevented.

When it is determined that the information of OFF is set to the NG flag SW_NG (the determination in step S230 is NO), the controller 40 proceeds to step S240.

In step S240, the controller 40 determines whether the same instruction identifier is assigned to both the current switch variable SWi and the previous switch variable SWi-1.

As described above, a same instruction identifier being assigned to both the current switch variable SWi and the previous switch variable SWi-1 shows that the operating condition of a switch corresponding to the same instruction identifier is kept unchanged during repeated execution of the switch operation detecting task. In other words, the same instruction identifier being assigned to both the current switch variable SWi and the previous switch variable SWi-1 shows that a switch corresponding to the same instruction identifier is continuously turned on during a constant period of time.

In contrast, different instruction identifiers being respectively assigned to the current switch variable SWi and the previous switch variable SWi-1 show an example of the following situation:

For example, as illustrated in FIG. 5, because no switches are pressed on before t0 so that the input level from the console 20 via the first and second input lines L1 and L2 is set to the voltage level V1, the determination in step S210 is NO.

When the input level from the console 20 via the first and second input lines L1 and L2 is changed from the previous voltage level V1 to a current voltage level V3 because of the corresponding set switch 36 being turned on, the determination in step S210 is YES.

Assuming that the switch operation detecting task is executed at every cycle of T, when the next cycle T has elapsed since t0, an instruction identifier "3" assigned to the previous variable VSWi-1 is matched with an instruction identifier "3" set to the current variable VSWi (see YES in step S110).

Note that, when the set switch 36 is released to be turned off before another switch is pressed on, the determination in step S210 of the cruise control task immediately after the release is NO.

In contrast, while the set switch 36 is pressed on, the cancel switch 34 is pressed on. In other words, the cancel and set switches 34 and 36 are concurrently pressed on.

In this state, the input level from the console 20 via the first and second input lines L1 and L2 is changed from the previous voltage level V3 corresponding to the set switch 36 to a current voltage level V4 corresponding to the cancel switch 34 at time t2.

Then, during the switch operation detecting task immediately after time t2, an instruction identifier "3" corresponding to the set switch 36 and assigned to the previous variable VSWi-1 is mismatched with an instruction identifier "2" corresponding to the cancel switch 34 and set to the current variable VSWi at time t3 (see NO in step S110). This results in that the switch operation detecting task is terminated. At that time, the instruction identifier "3" corresponding to the set switch 36 is continuously stored in the current switch variable SWi.

When the next switch operation detecting task is executed, an instruction identifier "2" corresponding to the cancel switch 34 and assigned to the previous variable VSWi-1 is matched with an instruction identifier "2" set to the current variable VSWi (see YES in step S110).

Then, in step S120, the instruction identifier "3", which has been assigned to the current switch variable SWi, is saved into the previous switch variable SWi-1.

Thereafter, in step S130, the instruction identifier "2", which has been assigned to the current variable VSWi, is assigned to the current switch variable SWi.

Accordingly, at that time t4, the different instruction identifiers "3" and "2" are assigned to the previous switch variable SWi-1 and the current switch variable SWi, respectively.

During one or more switch operation detecting tasks are executed, the cancel switch 34 is released to be off at time t5. A switch operation detecting task immediately after time t5 allows the instruction identifier "2" corresponding to the cancel switch 34 and assigned to the previous variable VSWi-1 to be mismatched with an instruction identifier "3" corresponding to the set switch 36 and set to the current variable VSWi at time t6 (see NO in step S110). This results in that the switch operation detecting task is terminated.

Thus, when it is determined that the same instruction identifier is assigned to both the current switch variable SWi and the previous switch variable SWi-1, in other words, the same switch corresponding to the same instruction identifier is continuously turned on (the determination in step S240 is YES), the controller 40 proceeds to step S250.

In step S250, the controller 40 sets its operation mode for cruise control based on the identified instruction (identified driver's switch operation) corresponding to the current switch variable SWi, exiting the cruise control task. In the normal drive mode, the vehicle speed is controlled by the driver's operations of an accelerator pedal and a brake pedal of the vehicle.

For example, when the identified instruction corresponding to the current switch variable SWi represents the main switch 32 being pressed on while a main switch flag F1 is OFF, the controller 40 shifts its operation mode from the normal drive mode to the cruise-control ready mode to thereby change the main switch flag F1 to ON in step S250. Note that the main switch flag F1 is for example set by software in the controller 40 each time the control unit 10 is booted. The information indicative of OFF is set as default information of the main switch flag F1 during the start-up process of the control unit 10.

During the main switch flag F1 being on state, the controller 40 waits for the pressing of, for example, the set switch 36 or resume switch 38 in order to start the cruise control corresponding to the set switch 36 or resume switch 38.

In contrast, when the instruction corresponding to the current switch variable SWi represents the main switch 32 being pressed on while the main switch flag F1 is ON, the controller 40 shifts its operation mode from a cruise-control mode to the normal drive mode to thereby change the main switch flag F1 to OFF in step S250, exiting the cruise control task.

When the identified instruction corresponding to the current switch variable SWi represents the cancel switch 34 being pressed on during execution of cruise in the cruise-control mode, the controller 40 shifts its operation mode from a cruise-control mode to the normal drive mode in step S250, exiting the cruise control task.

When the identified instruction corresponding to the current switch variable SWi represents the set switch 36 being pressed on in the normal drive mode or the cruise-control ready mode, the controller 40 shifts its operation mode from the normal drive mode or the cruise-control ready mode to a constant vehicle-speed control mode as the cruise-control mode in step S250. Thereafter, the controller 40 starts up a constant vehicle-speed control task in the constant vehicle-speed control mode, exiting the cruise control task.

Figure 6A:
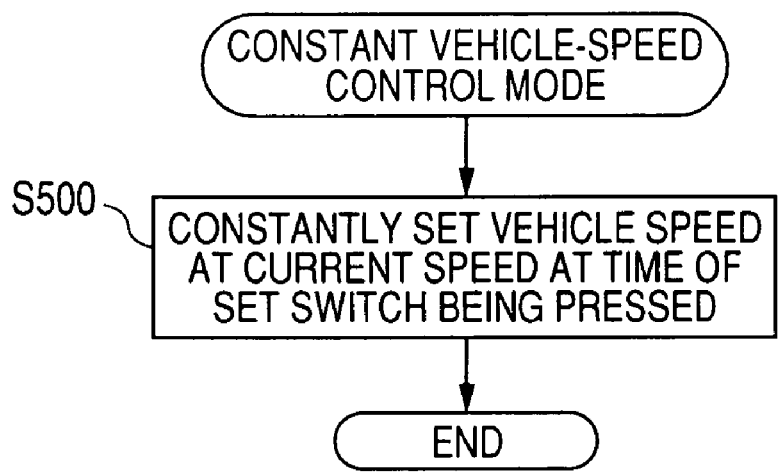
FIG. 6A is a flowchart schematically illustrating an example of a constant vehicle-speed control task to be executable by the controller according to the embodiment.

In the constant vehicle-speed control mode (the constant vehicle-speed control task), the controller 40 controls, via the I/O interface 42, the brakes BR and the actuators 52, such as the throttle valve 52a and the transmission 52b, based on the vehicle speed, the operating conditions of the individual brakes BR, and the monitored traffic, thus constantly setting the vehicle speed at the current speed at the time of the set switch 36 being pressed. These vehicle speed, operating conditions of the individual brakes BR, and monitored traffic are obtained based on the measurement signals sent from the sensors 50 and input to the controller 40 in step S500 of FIG. 6A.

When the identified instruction corresponding to the current switch variable SWi represents the resume switch 38 being pressed on in the normal drive mode or the cruise-control ready mode, the controller 40 shifts its operation mode from the normal drive mode or the cruise-control ready mode to a resume mode as the cruise-control mode in step S250. Thereafter, the controller 40 starts up a resume task in the resume mode, exiting the cruise control task.

Figure 6B:
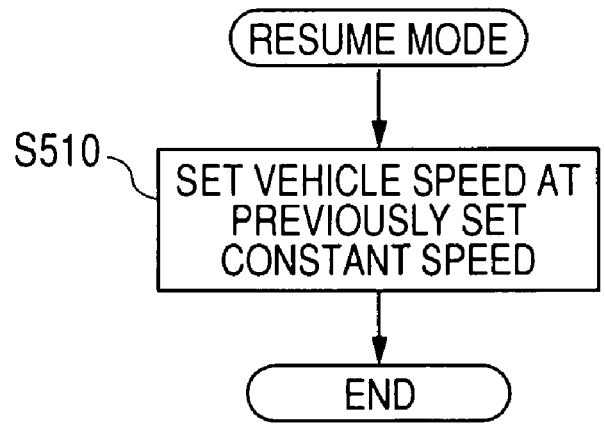
FIG. 6B is a flowchart schematically illustrating an example of a resume task to be executable by the controller according to the embodiment.

In the resume mode (resume task), the controller 40 controls, via the I/O interface 42, the brakes BR and the actuators 52, such as the throttle valve 52a and the transmission 52b, based on the vehicle speed, the operating conditions of the individual brakes BR, and the monitored traffic, thus setting the vehicle speed at the previously set constant speed in step S510 of FIG. 6B.

In addition, during the controller 40 operating in the constant vehicle-speed control mode, when the identified instruction represents the set switch 36 being pressed, the controller 40 accelerates the vehicle speed at a predetermined step.

Moreover, during the controller 40 operating in the constant vehicle-speed control mode, when the identified instruction represents the resume switch 38 being pressed, the controller 40 decelerates the vehicle speed at a predetermined step.

Otherwise, when it is determined that different instruction identifiers are respectively assigned to the current switch variable SWi and the previous switch variable SWi-1, in other words, different switches corresponding to the different instruction identifiers are turned on to be overlapped in duration with each other (the determination in step S240 is NO), the controller 40 proceeds to step S260.

In step S260, the controller 40 checks whether a cruise control based on a combination of the previous switch variable SWi-1 and the current switch variable SWi is disallowed based on at least one predetermined disallowed combination of the instruction identifiers "1", "2", "3", and "4" respectively corresponding to the switches 32, 34, 36, and 38. Note that, in FIG. 4, a combination of the previous switch variable SWi-1 and the current switch variable SWi is illustrated as (SWi-1, SWi).

In the embodiment, the at least one predetermined disallowed combination of the previous switch variable SWi-1 and the current switch variable SWi includes combinations of any one of the instruction identifies "1" and "2" corresponding to the main and cancel switches 32 and 34 and any one of the instruction identifiers "3" and "4" corresponding to the set and resume switches 36 and 38 are previously determined in, for example, the cruise control program. Note that data indicative of the predetermined disallowed combination of the previous switch variable SWi-1 and the current switch variable SWi can be stored in the storage unit 44.

Specifically, in step S260, the controller 40 checks whether a combination of the previous switch variable SWi-1 and the current switch variable SWi is matched with the predetermined disallowed combinations of any one of the instruction identifies "1" and "2" and any one of the instruction identifiers "3" and "4".

In step S260, when the instruction identifier "1" or "2" is set to the previous switch variable SWi-1 and the instruction identifier "3" or "4" is set to the current switch variable SWi, or when the instruction identifier "3" or "4" is set to the previous switch variable SWi-1 and the instruction identifier "1" or "2" is set to the current switch variable SWi, the determination in step S260 is affirmative.

That is, it is assumed that the driver unintentionally presses either the set switch 36 or resume switch 38 while intentionally pressing the cancel switch 34 or the main switch 32 for canceling.

In this assumption, when the cancel switch 34 or the main switch 32 is released to be off before the set switch 36 or the resume switch 38 is released to be off, the set switch 36 or resume switch 38 in on state enables the controller 40 to continue the corresponding cruise control despite of the driver's intention of canceling cruise control. This may cause the driver to mistrust in the cruise control system 1.

Therefore, in the embodiment, the controller 40 recognizes that the predetermined disallowed combinations any one of the instruction identifies "1" and "2" and any one of the instruction identifiers "3" and "4, which may cause the driver to mistrust in the cruise control system 1.

Note that, when the instruction identifier "3" or "4" is set to the previous switch variable SWi-1 and the instruction identifier "1" or "2" is set to the current switch variable SWi, it is not necessarily to determine that the combination of the previous switch variable SWi-1 and the current switch variable SWi is matched with the predetermined disallowed combinations. This is because, even if the on state in the main switch 32 or cancel switch 34 corresponding to the instruction identifier "1" or "2" remains in the console 20 despite of the driver's intention of continuing cruise control, there is only a little disadvantage for the driver.

When it is checked that a combination of the previous switch variable SWi-1 and the current switch variable SWi is mismatched with the predetermined disallowed combinations of any one of the instruction identifies "1" and "2" and any one of the instruction identifiers "3" and "4 (the determination in step S260 is NO), the controller 40 proceeds to step S270.

In step S270, the controller 40 sets its operation mode for cruise control based on the identified instruction corresponding to the current switch variable SWi as well as the operation in step S250.

Otherwise, when it is checked that a combination of the previous switch variable SWi-1 and the current switch variable SWi is matched with the predetermined disallowed combinations of any one of the instruction identifies "1" and "2" and any one of the instruction identifiers "3" and "4 (the determination in step S260 is YES), the controller 40 proceeds to step S280.

In step S280, the controller 40 sets the NG flag SW_NG to ON, exiting the cruise control task.

On the other hand, in step S230, when it is determined that information indicative of OFF is set to the NG flag SW_NG (the determination in step S230 is YES), the controller 40 determines whether the instruction corresponding to the instruction identifier set to the current switch variable SWi is accepted in step S290.

In the embodiment, as described above, when the main switch 32 for canceling or the cancel switch 34 corresponding to the instruction identifier "1" or "2" is pressed on even if the NG flag SW_NG is set ON, the operation of the main switch 32 for canceling or that of the cancel switch 34 should be accepted.

Thus, when the instruction identifier "1" or "2" is set to the current switch variable SWi and the main switch flag F1 is ON, the controller 40 determines that the instruction corresponding to the instruction identifier set to the current switch variable SWi is accepted (the determination in step S290 is YES).

Then, in step S300, the controller 40 sets its operation mode for cruise control based on the identified instruction corresponding to the current switch variable SWi as well as the operation in step S250.

Otherwise, when the instruction identifier "3" or "4" is set to the current switch variable SWi, or the instruction identifier "1" is set to current switch variable SWi, but the main switch flag F1 is OFF, the controller 40 determines that the instruction corresponding to the instruction identifier set to the current switch variable SWi is not accepted (the determination in step S290 is NO). Thereafter, the controller 40 exits the cruise control task.

As described above, when the NG flag SW_NG is set ON (YES in step S230), and the instruction identifier "3" or "4" except for "1" and "2" is set to the current switch variable SWi (NO in step S290), no instructions associated with cruise control are accepted by the controller 40.

On the other hand, in step S210, when it is determined that an instruction identifier assigned to the current switch variable SWi is equal to "0" (the determination in step S210 is NO), the controller 40 sets the NG flag SW_NG to OFF, exiting the cruise control task.

As described above, in the cruise control system 1 according to the embodiment, let us consider that one of the switches 32 to 38 is operated on and another one of the switches 32 to 38 is operated on with the at least one of the switches 32 to 38 being kept on. In other words, let us consider at least two of the switches 32 to 38 are concurrently operated on.

In this case, because the determination in step S240 of FIG. 4 is negative, the controller 40 prevents an instruction corresponding to the current switch variable SWi from being accepted only when a combination of one and another one of the switches 32 to 38 is matched with the predetermined disallowed combinations (see steps S260 to S280 of FIG. 4).

In the embodiment, the predetermined disallowed combinations of the previous switch variable SWi-1 and the current switch variable SWi include combinations each made of two switches in the switches 32 to 38 except for the remaining combinations of two switches therein; these remaining combinations do not necessarily cause the driver to mistrust in the cruise control system 1.

In step S260, the controller 40 is configured to check whether a combination of the previous switch variable SWi-1 and the current switch variable SWi is matched with the predetermined disallowed combinations of any one of the instruction identifies "1" and "2" and any one of the instruction identifiers "3" and "4.

When the instruction identifier "1" or "2" is set to the previous switch variable SWi-1 and the instruction identifier "3" or "4" is set to the current switch variable SWi, the determination in step S260 is affirmative. Then, the controller 40 disables acceptance of an instruction of a currently operated switch (see step S280).

As described above, it is assumed that the driver unintentionally presses either the set switch 36 or resume switch 38 while intentionally pressing the cancel switch 34 or the main switch 32 for canceling.

In this assumption, when the cancel switch 34 or the main switch 32 is released to be off before the set switch 36 or the resume switch 38 is released to be off, the set switch 36 or resume switch 38 in on state enables the controller 40 to continue the corresponding cruise control despite of the driver's intention of canceling cruise control. This may cause the driver to mistrust in the cruise control system 1.

Thus, in the embodiment, it is possible to disable acceptance of an instruction corresponding to the instruction identifier "3" or "4" set to the current switch variable SWi when both the main switch 32 or the cancel switch 34 and the set switch 36 or the resume switch 38 are operated on to be substantially overlapped in duration with each other. This can prevent the controller 40 from executing cruise control despite of the driver's intention.

In steps S290 and S300, when the instruction identifier "1" or "2" is set to the current switch variable SWi and the main switch flag F1 is ON, the controller 40 determines that the main switch 32 for canceling or the cancel switch 34 corresponding to the instruction identifier "1" or "2" is pressed on. Then, the controller 40 accepts the instruction corresponding to the main switch 32 for canceling or the cancel switch 34, making it possible to cancel cruise control in step S300.

That is, in the embodiment, when the main switch 32 for canceling or the cancel switch 34 corresponding to the instruction identifier "1" or "2" is pressed on even if the NG flag SW_NG is set ON, the operation of the main switch 32 for canceling or that of the cancel switch 34 can be accepted, making it possible to more improve the safety of the cruise control system 1.

In the embodiment, the console 20 includes the main switch 32, the cancel switch 34, the set switch 36, and the resume switch 38 that are parallely connected to each other, but the present invention is not limited to the structure.

Specifically, as the circuit structure of the consol 20, one or more switches designed to send instructions to the controller 40 can be electrically connected to a plurality of pull-up resistors different in resistance from each other and electrically connected to the internal power supply 12.

Figure 7:
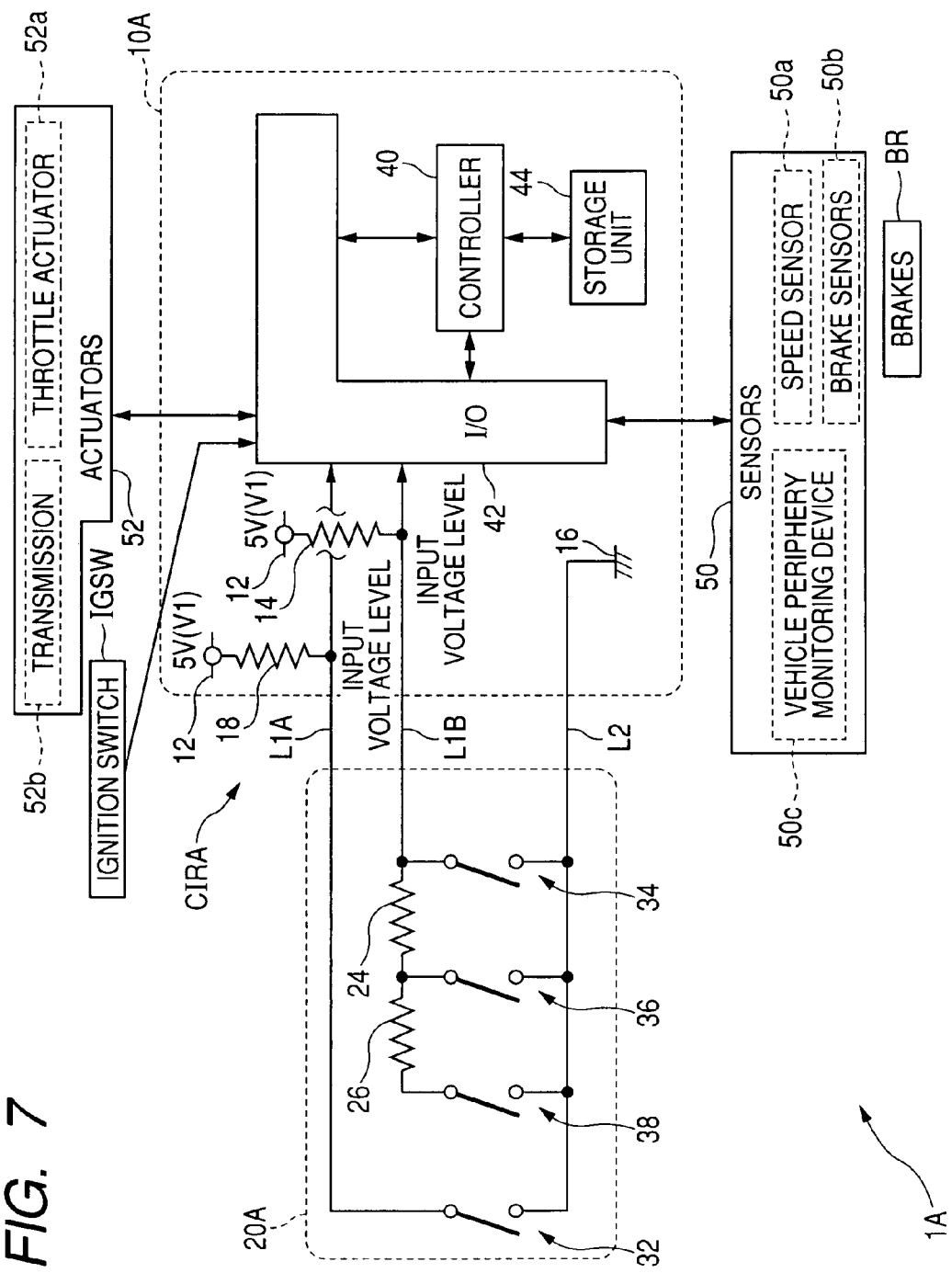
FIG. 7 is a block diagram schematically illustrating an example of the overall structure of a modification of a cruise control system according to the embodiment of the present invention.

As illustrated in FIG. 7, in a cruise control system 1A according to a modification of the embodiment, a control unit 10A and a console 20A are electrically connected to each other via input lines L1A, L1B, and L2.

The control unit 10A is equipped with a pull-up resistor 18 in addition to the internal power supply 12, the ground 16, the controller 40, the I/O interface 42, and the storage unit 44.

As compared with the configuration of the console 20 illustrated in FIG. 1, no first resistor 22 is provided in the console 20A. Except for the first resistor 22, the console 20A has the substantially same configuration as the console 20 illustrated in FIG. 1.

The pull-up resistor 14 is electrically connected to the power supply 12 and the input line L1B. The pull-up resistor 14 allows the input line L1B to be pulled up. One end of the input line L1B is electrically connected to the I/O interface 42 of the control unit 10A.

The pull-up resistor 18 with a resistance R18 is electrically connected to the power supply 12 and the input line L1A. The pull-up resistor 18 allows the input line L1A to be pulled up. One end of the input line L1A is electrically connected to the I/O interface 42 of the control unit 10A.

The other end of the input line L1A is electrically connected to one end of the main switch 32, and the other end of the main switch 32 is connected to the input line L2. The input line L2 is electrically connected to the ground 16.

The cancel switch 34 is electrically connected between the input line L2 and one end of the input line L1B, and the one end of the input line L1B is electrically connected to one end of the second resistor 24.

The set switch 36 is electrically connected between the other end of the second resistor 24 and the input line L2.

The resume switch 38 is electrically connected between the other end of the third resistor 26 and the input line L2.

The electrical connections among the switches 34, 36, and 38 allow the turning on of any one of the switches 34, 36, and 38 to set a unique resistance of an input level changing circuit CIRA constituted between the power supply 12 and the ground 16.

Specifically, the input level changing circuit CIRA of the console 20A works to change an input level on the input line L1B to the controller 40 via the I/O interface 42 depending on any one of the switches 34, 36, and 38 being turned on.

In addition, when the switch 32 is off, the input level on the input line L1A is set to the voltage level V1. The turning on of the main switch 32 allows the resistance of a circuit constituted by the power supply 12, the input line L1A, the main switch 32, and the ground 16 to be set to the resistance R18 of the pull-up resistor 18.

Accordingly, the controller 40 works to identify which switches are operated by the driver based on any one of the input levels thereto via the input lines L1A, L1B, and L2.

Other structures and operations of the cruise control system 1A are substantially identical to those of the cruise control system 1 according to the embodiment.

Figure 8:
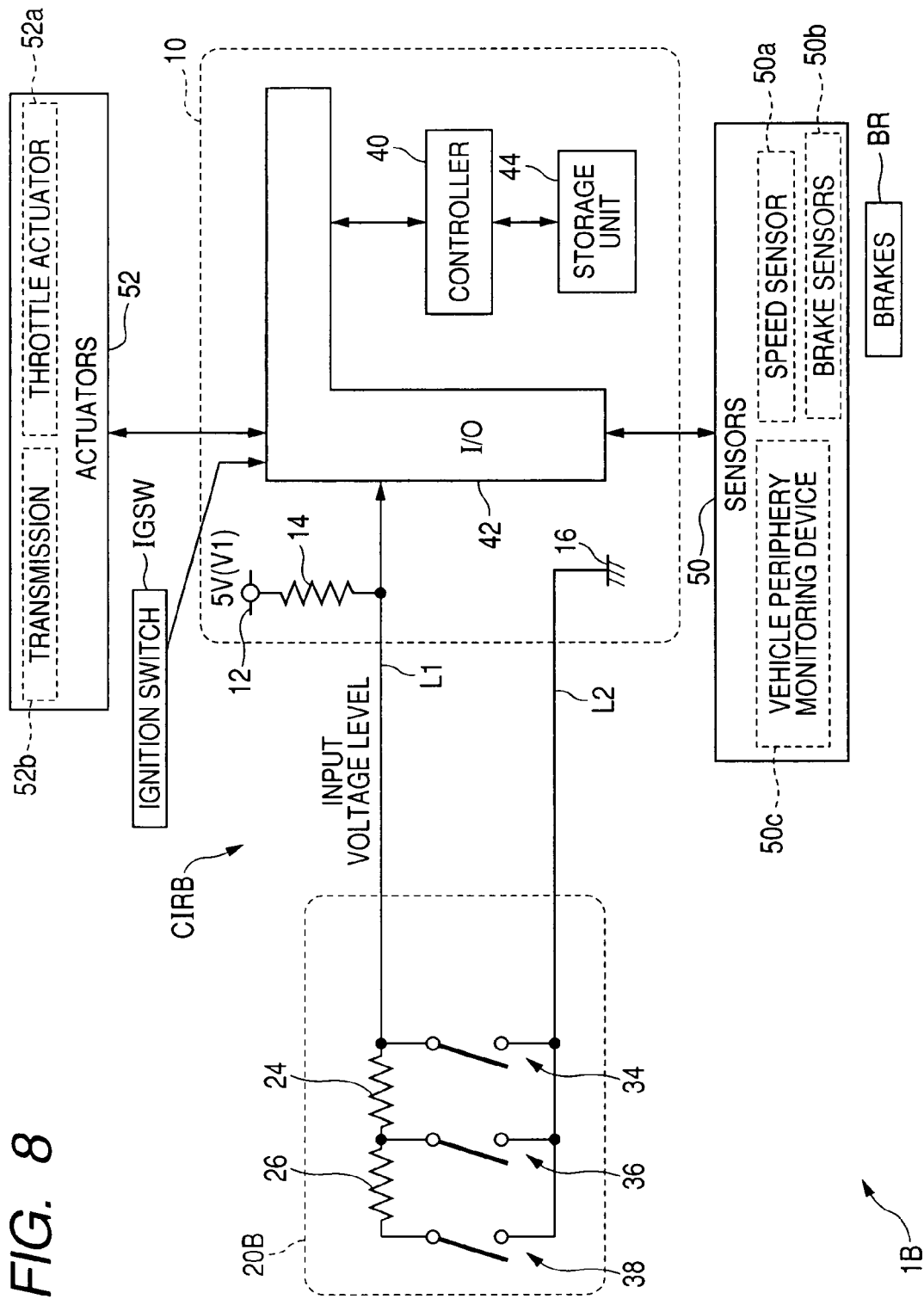
FIG. 8 is a block diagram schematically illustrating an example of the overall structure of another modification of a cruise control system according to the embodiment of the present invention.

As illustrated in FIG. 8, in a cruise control system 1B according to another modification of the embodiment, the control unit 10 and a console 20B are electrically connected to the first and second input lines L1 and L2.

As compared with the configuration of the console 20 illustrated in FIG. 1, no main switch 32 is provided in the console 20B. Except for the main switch 32, the console 20B has the substantially same configuration as the console 20 illustrated in FIG. 1.

Specifically, in the cruise control system 1B, during the controller 40 operating in the normal drive mode, when the set switch 36 is pressed, a corresponding instruction is sent to the controller 40. Then, the controller 40 works to carry out the constant vehicle-speed control to thereby constantly set the vehicle speed at the current speed at the time of the set switch 36 being pressed.

Moreover, in the cruise control system 1B, during the controller 40 operating in the normal drive mode, when the resume switch 38 is pressed, a corresponding instruction is sent to the controller 40. Then, the controller 40 works to carry out the constant vehicle-speed control to thereby set the vehicle speed at the previously set constant speed.

In the embodiment, as the predetermined disallowed combinations of the previous switch variable SWi-1 and the current switch variable SWi, combinations of any one of the instruction identifies "1" and "2" corresponding to the main and cancel switches 32 and 34 and any one of the instruction identifiers "3" and "4" corresponding to the set and resume switches 36 and 38 are previously determined as examples. The present invention is not limited to the combinations.

Specifically, combinations of one of the instruction identifiers corresponding to one switch and another at least one of the instruction identifiers corresponding to another switch can be previously determined as the predetermined disallowed combinations of the previous switch variable SWi-1 and the current switch variable SWi.

In the embodiment, the controller 40 is programmed to execute, as cruise control, constant vehicle-speed control to thereby constantly set the vehicle speed at the current speed at the time of the set switch 36 being pressed or the at the previously set constant speed. The present invention is not limited to the structure.

Specifically, when an instruction is sent from, for example, the set switch 36 being operated, the controller 40 can work to:

control, via the I/O interface 42, the brakes BR and the actuators 52, such as the throttle valve 52a and the transmission 52b, based on the vehicle speed, the operating conditions of the individual brakes BR, and the monitored traffic, thus altering the vehicle speed to maintain the desired interval while following the monitored traffic.

While there has been described what is at present considered to be the embodiment and its modifications of the present invention, it will be understood that various modifications which are not described yet may be made therein, and it is intended to cover in the appended claims all such modifications as fall within the true spirit and scope of the invention.

What is claimed is:

1. A cruise control system installed in a vehicle and electrically connected to a plurality of switches installed therein, the plurality of switches including a first and a second switch, each of the plurality of switches configured to send, to the cruise control system, an instruction associated with cruise control of the vehicle when operated, the cruise control system comprising:

a detecting unit configured to detect that at least one of the plurality of switches is operated;

a determining unit having at least one predetermined combination of instructions to be sent from the plurality of switches as at least one disallowed combination, having any combination of instructions, except for the at least one disallowed combination, to be sent from the plurality of switches as one or more allowed combinations, and configured to, when the detecting unit detects that, during the first switch being operated, the second switch is operated, determine whether a combination of first and second instructions sent from the detected first and second switches is matched with the at least one disallowed combination or the one or more allowed combination; and a cruise control unit configured to:
 accept an instruction corresponding to the at least one of the plurality of switches upon detection of the at least one of the plurality of switches being operated to thereby execute cruise control of the vehicle based on the accepted instruction;
 prevent acceptance of the second instruction when it is determined that the combination of the first and second instructions is matched with the at least one disallowed combination; and
 accept the second instruction when it is determined, that the combination of the first and second instructions is matched with the one or more allowed combinations.

2. The cruise control system according to claim 1, wherein:
the plurality of switches includes a main switch, a cancel switch, a set switch, and a resume switch, the main switch sending, to the cruise control system, an instruction for one of ready and stop of cruise control of the vehicle when operated, the cancel switch sending, to the cruise control system, an instruction for cancel of cruise control of the vehicle when operated, the set switch sending, to the cruise control system, an instruction for start of cruise control of the vehicle at a current speed when operated, the current speed being a speed at a time of the set switch being operated, the resume switch sending, to the cruise control system, an instruction for resuming cruise control of the vehicle at a preset speed, the first switch is one of the main switch and the cancel switch, the second switch is one of the set switch and the resume switch, the main switch, the cancel switch, the set switch, and the resume switch are prioritized in this order, and when, during one of the main switch, the cancel switch, the set switch, and the resume switch being operated as the first switch, an alternative one of the main switch, the cancel switch, the set switch, and the resume switch, which is lower in priority than the operated one of the main switch, the cancel switch, the set switch, and the resume switch, is operated as the second switch, the detecting unit is configured to detect the one of the main switch, the cancel switch, the set switch, and the resume switch in higher priority than the alternative one of the main switch, the cancel switch, the set switch, and the resume switch.

3. The cruise control system according to claim 2, further comprising a power supply; a first line; a pull-up resistor connected to the power supply and the first line; a first resistor; a second resistor; a third resistor; and a second line, wherein the main switch has opposing first and second ends, the first end is connected to the power supply via the first line and the pull-up resistor, the other end is connected to ground via the second line, the cancel switch has opposing first and second ends, the first end of the cancel switch is connected to the power supply via the first line, the first resistor and the pull-up resistor, the second end of the cancel switch is connected to the ground via the second line, the set switch has opposing first and second ends, the first end of the set switch is connected to the power supply via the first line, the first resistor, the second resistor, and the pull-up resistor, the second end of the set switch is connected to the ground via the second line, the resume switch has opposing first and second ends, the first end of the resume switch is connected to the power supply via the first line, the first resistor, the second resistor, the third resistor, and the pull-up resistor, the second end of the resume switch is connected to the ground via the second line, the main switch, the cancel switch, the set switch, and the resume switch are prioritized in this order because, even if at least two switches in the main switch, the cancel switch, the set switch, and the resume switch are simultaneously operated, a resistance of a circuit formed between the power supply and the ground is set to be identical to a resistance of the circuit in which one of the at least two switches is only turned on, the one of the at least two switches being located closer to the pull-up resistor than the other thereof, the detecting unit is configured to detect operations of the plurality of switches based on a signal level on the first line.

4. A cruise control system according to claim 1, wherein the first switch is configured to send, to the cruise control system, the first instruction enabling the cruise control unit to cancel cruise control of the vehicle, the second switch is configured to send, to the cruise control system, the second instruction enabling the cruise control unit to start cruise control of the vehicle, and the detecting unit is configured to detect that the first switch is operated and that the second switch is operated during the first switch being operated.

5. A cruise control system according to claim 1, wherein the cruise control unit is configured to, when it is determined that the combination of the first and second instructions is matched with the at least one disallowed combination, accept one of the first and second instructions to thereby execute cruise control of the vehicle based on the accepted one of the first and second instructions upon the accepted one of the first and second instructions enabling the cruise control unit to cancel cruise control of the vehicle.

6. A cruise control system according to claim 1, wherein each of the instructions including the first and second instructions to be sent from the plurality of switches is an electric signal with a predetermined level, the predetermined levels of the instructions to be sent from the plurality of switches allow the instructions to be identified with each other, the plurality of switches are prioritized such that, when one switch and another switch lower in priority than the one switch are operated to be overlapped in duration with each other, the one switch takes priority to thereby send an instruction to the cruise control system, and the detecting unit is configured to detect that, during the first switch being operated, the second switch is operated based on the levels of the first and second instructions sent from the first and second switches.

7. The cruise control system according to claim 1, wherein the plurality of switches includes a main switch, a cancel switch, a set switch, and a resume switch, the main switch sending, to the cruise control system, an instruction for one of ready and stop of cruise control of the vehicle when operated, the cancel switch sending, to the cruise control system, an instruction for cancel of cruise control of the vehicle when operated, the set switch sending, to the cruise control system, an instruction for start of cruise control of the vehicle at a current speed when operated, the current speed being a speed at a time of the set switch being operated, the resume switch sending, to the cruise control system, an instruction for resuming cruise control of the vehicle at a preset speed, the first switch is one of the main switch and the cancel switch, the second switch is one of the set switch and the resume switch, and the cruise control unit is configured to:
   accept the second instruction when it is determined that the combination of the first and second instructions is mismatched with the at least one disallowed combination.

8. A cruise control system installed in a vehicle and electrically connected to a plurality of switches installed therein, the plurality of switches including a first and a second switch, each of the plurality of switches being configured to send, to the cruise control system, an instruction associated with cruise control of the vehicle when operated, the cruise control system comprising:
   a detecting unit configured to detect that at least one of the plurality of switches is operated;
   a cruise control unit configured to execute cruise control of the vehicle based on an instruction corresponding to the at least one of the plurality of switches upon detection of the at least one of the plurality of switches being operated;
   a cruise control disabling unit having at least one predetermined combination of instructions to be sent from the plurality of switches as at least one disallowed combination, and configured to, when the detecting unit detects that, during the first switch being operated, the second switch is operated, and when a combination of first and second instructions sent from the detected first and second switches is matched with the at least one disallowed combination, disable the cruise control unit to execute cruise control of the vehicle based on the second instruction; and
   a cruise control enabling unit having any combination of instructions, except for the at least one disallowed combination, to be sent from the plurality of switches as one or more allowed combinations, and configured to, when the detecting unit detects that, during the first switch being operated, the second switch is operated, and when the combination of the first and second instructions sent from the detected first and second switches is matched with the one or more allowed combinations, enable the cruise control unit to execute cruise control of the vehicle based on the second instruction.

9. The cruise control system according to claim 8, wherein:
   the plurality of switches includes a main switch, a cancel switch, a set switch, and a resume switch, the main switch sending, to the cruise control system, an instruction for one of ready and stop of cruise control of the vehicle when operated, the cancel switch sending, to the cruise control system, an instruction for cancel of cruise control of the vehicle when operated, the set switch sending, to the cruise control system, an instruction for start of cruise control of the vehicle at a current speed when operated, the current speed being a speed at a time of the set switch being operated, the resume switch sending, to the cruise control system, an instruction for resuming cruise control of the vehicle at a preset speed, the first switch is one of the main switch and the cancel switch, the second switch is one of the set switch and the resume switch,
   the main switch, the cancel switch, the set switch, and the resume switch are prioritized in this order, and
   when, during one of the main switch, the cancel switch, the set switch, and the resume switch being operated as the first switch, an alternative one of the main switch, the cancel switch, the set switch, and the resume switch, which is lower in priority than the operated one of the main switch, the cancel switch, the set switch, and the resume switch, is operated as the second switch, the detecting unit is configured to detect the one of the main switch, the cancel switch, the set switch, and the resume switch in higher priority than the alternative one of the main switch, the cancel switch, the set switch, and the resume switch.

10. The cruise control system according to claim 9, further comprising a power supply; a first line; a pull-up resistor connected to the power supply and the first line; a first resistor; a second resistor; a third resistor; and a second line,
   wherein the main switch has opposing first and second ends, the first end is connected to the power supply via the first line and the pull-up resistor, the other end is connected to ground via the second line, the cancel switch has opposing first and second ends, the first end of the cancel switch is connected to the power supply via the first line, the first resistor and the pull-up resistor, the second end of the cancel switch is connected to the ground via the second line, the set switch has opposing first and second ends, the first end of the set switch is connected to the power supply via the first line, the first resistor, the second resistor, and the pull-up resistor, the second end of the set switch is connected to the ground via the second line, the resume switch has opposing first and second ends, the first end of the resume switch is connected to the power supply via the first line, the first resistor, the second resistor, the third resistor, and the pull-up resistor, the second end of the resume switch is connected to the ground via the second line, the main switch, the cancel switch, the set switch, and the resume switch are prioritized in this order because, even if at least two switches in the main switch, the cancel switch, the set switch, and the resume switch are simultaneously operated, a resistance of a circuit formed between the power supply and the ground is set to be identical to a resistance of the circuit in which one of the at least two switches is only turned on, the one of the at least two switches being located closer to the pull-up resistor than the other thereof, the detecting unit is configured to detect operations of the plurality of switches based on a signal level on the first line.

11. A cruise control system according to claim 8, further comprising:

an accepting unit configured to:

determine whether to accept an instruction sent from another switch contained in the plurality of switches being operated after the cruise control of the vehicle based on the second instruction is disabled by the cruise control disabling unit, the another switch being a switch other than the second switch; and accept the instruction sent from the another switch when it is determined that the instruction is accepted, thus executing cruise control of the vehicle based on the instruction sent from the another switch.

12. The cruise control system according to claim 8, wherein the plurality of switches includes a main switch, a cancel switch, a set switch, and a resume switch, the main switch sending, to the cruise control system, an instruction for one of ready and stop of cruise control of the vehicle when operated, the cancel switch sending, to the cruise control system, an instruction for cancel of cruise control of the vehicle when operated, the set switch sending, to the cruise control system, an instruction for of start cruise control of the vehicle at a current speed when operated, the current speed being a speed at a time of the set switch being operated, the resume switch sending, to the cruise control system, an instruction for resuming cruise control of the vehicle at a preset speed, the first switch is one of the main switch and the cancel switch, the second switch is one of the set switch and the resume switch, and the cruise control disabling unit is configured to, when the detecting unit detects that, during the first switch being operated, the second switch is operated, and when a combination of first and second instructions sent from the detected first and second switches is mismatched with the at least one disallowed combination, enable the cruise control unit to execute cruise control of the vehicle based on the second instruction.

13. A program product embedded in a media accessible by a computer installed in a vehicle and electrically connected to a plurality of switches installed therein, the plurality of switches including a first and a second switch, each of the plurality of switches configured to send, to the computer, an instruction associated with cruise control of the vehicle when operated, the program product comprising:

first means for instructing the computer to detect that at least one of the plurality of switches is operated;

second means, having at least one predetermined combination of instructions to be sent from the plurality of switches as at least one disallowed combination and having any combination of instructions, except for the at least one disallowed combination, to be sent from the plurality of switches as one or more allowed combinations, for instructing the computer to, when, during the first switch being operated, operation of the second switch is detected, determine whether a combination of first and second instructions sent from the detected first and second switches is matched with the at least one disallowed combination or the one or more allowed combinations;

third means for instructing the computer to accept an instruction corresponding to the at least one of the plurality of switches upon detection of the at least one of the plurality of switches being operated to thereby execute cruise control of the vehicle based on the accepted instruction;

fourth means for instructing the computer to prevent acceptance of the second instruction when it is determined that the combination of the first and second instructions is matched with the at least one disallowed combination; and fifth means for instructing the computer to accept the second instruction when it is determined that the combination of the first and second instructions is matched with the one or more allowed combinations.

14. The program product according to claim 13, wherein:

the plurality of switches includes a main switch, a cancel switch, a set switch, and a resume switch, the main switch sending, to the cruise control system, an instruction for one of ready and stop of cruise control of the vehicle when operated, the cancel switch sending, to the cruise control system, an instruction for cancel of cruise control of the vehicle when operated, the set switch sending, to the cruise control system, an instruction for start of cruise control of the vehicle at a current speed when operated, the current speed being a speed at a time of the set switch being operated, the resume switch sending, to the cruise control system, an instruction for resuming cruise control of the vehicle at a preset speed, the first switch is one of the main switch and the cancel switch, the second switch is one of the set switch and the resume switch, the main switch, the cancel switch, the set switch, and the resume switch are prioritized in this order, and when, during one of the main switch, the cancel switch, the set switch, and the resume switch being operated as the first switch, an alternative one of the main switch, the cancel switch, the set switch, and the resume switch, which is lower in priority than the operated one of the main switch, the cancel switch, the set switch, and the resume switch, is operated as the second switch, the first means for instructing the computer to detect the one of the main switch, the cancel switch, the set switch, and the resume switch in higher priority than the alternative one of the main switch, the cancel switch, the set switch, and the resume switch.

15. The program product according to claim 14, further comprising a power supply; a first line; a pull-up resistor connected to the power supply and the first line; a first resistor; a second resistor; a third resistor; and a second line, wherein the main switch has opposing first and second ends, the first end is connected to the power supply via the first line and the pull-up resistor, the other end is connected to ground via the second line, the cancel switch has opposing first and second ends, the first end of the cancel switch is connected to the power supply via the first line, the first resistor and the pull-up resistor, the second end of the cancel switch is connected to the ground via the second line, the set switch has opposing first and second ends, the first end of the set switch is connected to the power supply via the first line, the first resistor, the second resistor, and the pull-up resistor, the second end of the set switch is connected to the ground via the second line, the resume switch has opposing first and second ends, the first end of the resume switch is connected to the power supply via the first line, the first resistor, the second resistor, the third resistor, and the pull-up resistor, the second end of the resume switch is connected to the ground via the second line, the main switch, the cancel switch, the set switch, and the resume switch are prioritized in this order because, even if at least two switches in the main switch, the cancel switch, the set switch, and the resume switch are simultaneously operated, a resistance of a circuit formed between the power supply and the ground is set to be identical to a resistance of the circuit in which one of the at least two switches is only turned on, the one of the at least two switches being located closer to the pull-up resistor than the other thereof, the first means for instructing the computer to detect operations of the plurality of switches based on a signal level on the first line.

16. A program product according to claim 13, wherein the first switch is configured to send, to the computer, the first instruction enabling the computer to cancel cruise control of the vehicle, the second switch is configured to send, to the computer, the second instruction enabling the computer to start cruise control of the vehicle, and the first means is configured to instruct the computer to detect that the first switch is operated and that the second switch is operated during the first switch being operated.

17. A program product according to claim 13, wherein the fourth means is configured to instruct the computer to, when it is determined that the combination of the first and second instructions is matched with the at least one disallowed combination, accept one of the first and second instructions to thereby execute cruise control of the vehicle based on the accepted one of the first and second instructions upon the accepted one of the first and second instructions enabling the computer to cancel cruise control of the vehicle.

18. A program product according to claim 13, wherein each of the instructions including the first and second instructions to be sent from the plurality of switches is an electric signal with a predetermined level, the predetermined levels of the instructions to be sent from the plurality of switches allow the instructions to be identified with each other, the plurality of switches are prioritized such that, when one switch and another switch lower in priority than the one switch are operated to be overlapped in duration with each other, the one switch takes priority to thereby send an instruction to the computer, and the first means is configured to instruct the computer to detect that, during the first switch being operated, the second switch is operated based on the levels of the first and second instructions sent from the first and second switches.

19. The program product according to claim 13, wherein the plurality of switches includes a main switch, a cancel switch, a set switch, and a resume switch, the main switch sending, to the computer, an instruction for one of ready and stop of cruise control of the vehicle when operated, the cancel switch sending, to the computer, an instruction for cancel of cruise control of the vehicle when operated, the set switch sending, to the computer, an instruction for start of cruise control of the vehicle at a current speed when operated, the current speed being a speed at a time of the set switch being operated, the resume switch sending, to the computer, an instruction for resuming cruise control of the vehicle at a preset speed, the first switch is one of the main switch and the cancel switch, the second switch is one of the set switch and the resume switch, and the fourth means is configured to further instruct the computer to accept the second instruction when it is determined that the combination of the first and second instructions is mismatched with the at least one disallowed combination.

20. A program product embedded in a media accessible by a computer installed in a vehicle and electrically connected to a plurality of switches installed therein, the plurality of switches including a first and a second switch, each of the plurality of switches being configured to send, to the computer, an instruction associated with cruise control of the vehicle when operated, the program product comprising:

first means for instructing the computer to detect that at least one of the plurality of switches is operated;

second means for instructing the computer to execute cruise control of the vehicle based on an instruction corresponding to the at least one of the plurality of switches upon detection of the at least one of the plurality of switches being operated;

third means, having at least one predetermined combination of instructions to be sent from the plurality of switches as at least one disallowed combination, for instructing the computer to, when, during the first switch being operated, the second switch is operated, and when a combination of first and second instructions sent from the detected first and second switches is matched with the at least one disallowed combination, disable the computer to execute cruise control of the vehicle based on the second instruction; and fourth means, having any combination of instructions, except for the at least one disallowed combination, to be sent from the plurality of switches as one or more allowed combinations, for instructing the computer to, when, during the first switch being operated, the second switch is operated, and when the combination of the first and second instructions sent from the detected first and second switches is matched with the one or more allowed combinations, enable the cruise control unit to execute cruise control of the vehicle based on the second instruction.

21. The program product according to claim 20, wherein:

the plurality of switches includes a main switch, a cancel switch, a set switch, and a resume switch, the main switch sending, to the cruise control system, an instruction for one of ready and stop of cruise control of the vehicle when operated, the cancel switch sending, to the cruise control system, an instruction for cancel of cruise control of the vehicle when operated, the set switch sending, to the cruise control system, an instruction for start of cruise control of the vehicle at a current speed when operated, the current speed being a speed at a time of the set switch being operated, the resume switch sending, to the cruise control system, an instruction for resuming cruise control of the vehicle at a preset speed, the first switch is one of the main switch and the cancel switch, the second switch is one of the set switch and the resume switch, the main switch, the cancel switch, the set switch, and the resume switch are prioritized in this order, and when, during one of the main switch, the cancel switch, the set switch, and the resume switch being operated as the first switch, an alternative one of the main switch, the cancel switch, the set switch, and the resume switch, which is lower in priority than the operated one of the main switch, the cancel switch, the set switch, and the resume switch, is operated as the second switch, the first means for instructing the computer to detect the one of the main switch, the cancel switch, the set switch, and the resume switch in higher priority than the alternative one of the main switch, the cancel switch, the set switch, and the resume switch.

22. The program product according to claim 21, further comprising a power supply; a first line; a pull-up resistor connected to the power supply and the first line; a first resistor; a second resistor; a third resistor; and a second line, wherein the main switch has opposing first and second ends, the first end is connected to the power supply via the first line and the pull-up resistor, the other end is connected to ground via the second line, the cancel switch has opposing first and second ends, the first end of the cancel switch is connected to the power supply via the first line, the first resistor and the pull-up resistor, the second end of the cancel switch is connected to the ground via the second line, the set switch has opposing first and second ends, the first end of the set switch is connected to the power supply via the first line, the first resistor, the second resistor, and the pull-up resistor, the second end of the set switch is connected to the ground via the second line, the resume switch has opposing first and second ends, the first end of the resume switch is connected to the power supply via the first line, the first resistor, the second resistor, the third resistor, and the pull-up resistor, the second end of the resume switch is connected to the ground via the second line, the main switch, the cancel switch, the set switch, and the resume switch are prioritized in this order because, even if at least two switches in the main switch, the cancel switch, the set switch, and the resume switch are simultaneously operated, a resistance of a circuit formed between the power supply and the ground is set to be identical to a resistance of the circuit in which one of the at least two switches is only turned on, the one of the at least two switches being located closer to the pull-up resistor than the other thereof, the first means for instructing the computer to detect operations of the plurality of switches based on a signal level on the first line.

23. A program product according to claim 20, further comprising:

fourth means for instructing the computer to:

determine whether to accept an instruction sent from another switch contained in the plurality of switches being operated after the cruise control of the vehicle based on the second instruction is disabled by the computer, the another switch being a switch other than the second switch; and accept the instruction sent from the another switch when it is determined that the instruction is accepted, thus executing cruise control of the vehicle based on the instruction sent from the another switch.

24. The program product according to claim 20, wherein the plurality of switches includes a main switch, a cancel switch, a set switch, and a resume switch, the main switch sending, to the computer, an instruction for one of ready and stop of cruise control of the vehicle when operated, the cancel switch sending, to the computer, an instruction for cancel of cruise control of the vehicle when operated, the set switch sending, to the computer, an instruction for start of cruise control of the vehicle at a current speed when operated, the current speed being a speed at a time of the set switch being operated, the resume switch sending, to the computer, an instruction for resuming cruise control of the vehicle at a preset speed, the first switch is one of the main switch and the cancel switch, the second switch is one of the set switch and the resume switch, and the third means is configured to further instruct the computer to, when, during the first switch being operated, the second switch is operated, and when a combination of first and second instructions sent from the detected first and second switches is mismatched with the at least one disallowed combination, execute cruise control of the vehicle based on the second instruction.

* * * * *